United States Patent [19]
Hall

[11] Patent Number: 5,241,008
[45] Date of Patent: Aug. 31, 1993

[54] PROCESS FOR PRODUCING CONTINUOUSLY TAPERED POLYMERS AND COPOLYMERS AND PRODUCTS PRODUCED THEREBY

[75] Inventor: James E. Hall, Mogadore, Ohio

[73] Assignee: Bridgestone/Firestone, Inc., Akron, Ohio

[21] Appl. No.: 754,493

[22] Filed: Sep. 3, 1991

[51] Int. Cl.$^5$ .................. C08F 297/04; C08F 36/04; C08F 136/06; C08F 236/10
[52] U.S. Cl. .................. 525/314; 525/271; 525/250; 525/315; 525/316
[58] Field of Search ............. 525/314, 271, 250; 526/174, 173

[56] References Cited

U.S. PATENT DOCUMENTS

| | | | |
|---|---|---|---|
| 3,598,886 | 8/1971 | Hoeg et al. | 525/314 |
| 3,700,748 | 10/1972 | Winkler | 525/314 |
| 3,823,203 | 7/1974 | De La Mare | 525/314 |
| 4,022,959 | 5/1977 | Sommer et al. | 526/180 |
| 4,057,601 | 11/1977 | Moczygemba | 525/314 |
| 4,430,472 | 2/1984 | Guzy | 525/314 |
| 4,431,777 | 2/1984 | Tung et al. | 525/314 |
| 4,631,314 | 12/1986 | Tung et al. | 525/314 |
| 4,672,097 | 6/1987 | Hall | 526/174 |
| 4,843,120 | 6/1989 | Halasa et al. | 525/314 |
| 4,868,245 | 9/1989 | Pottick et al. | 525/314 |
| 4,940,756 | 7/1990 | Broekhois et al. | 525/314 |
| 4,950,719 | 8/1990 | Oyama et al. | 525/212 |
| 5,047,484 | 9/1991 | Tung | 525/314 |
| 5,070,148 | 12/1991 | Hsu et al. | 525/314 |
| 5,071,920 | 12/1991 | Tung | 525/314 |

*Primary Examiner*—James J. Seidleck
*Assistant Examiner*—M. L. Warzel
*Attorney, Agent, or Firm*—Frank J. Troy, Sr.

[57] ABSTRACT

A process for preparing continuously tapered polymers and copolymers having a continuous change in microstructure along the polymer backbone is disclosed. The process produces polymers and copolymers with multiple glass transition temperatures of very small energy absorption, i.e. no definable glass transition temperature. The polymers have a flexible chain end and they progressively become stiffer along the length of the chain.

21 Claims, No Drawings

PROCESS FOR PRODUCING CONTINUOUSLY TAPERED POLYMERS AND COPOLYMERS AND PRODUCTS PRODUCED THEREBY

FIELD OF THE INVENTION

This invention relates generally to processes for producing continuously tapered rubbery polymers and copolymers and to the continuously tapered rubbery polymers and copolymers produced thereby.

BACKGROUND OF THE INVENTION

In a paper presented at the spring meeting of ACS Rubber Division held on May 8-11, 1984 in Indianapolis, Ind., Dr. K. H. Nordsiek discussed model studies for the development of an ideal tire tread rubber. The postulated ideal rubber for tire tread is not capable of description by a characteristic glass transition temperature, $T_g$, which is considered a useful physical criterion for determining the characteristics of amorphous rubbers. Instead the rubber represents the sum of a large number of different block structures having varying $T_g$ values.

Batch polymerization of 1,3-butadiene monomers with styrene monomers in the presence of an anionic initiator yields a block copolymer having a slight taper due to differences in the reactivity of the monomers. However, there are still two sharp glass transition temperatures associated with formation of both a mostly polybutadiene block and a mostly polystyrene block.

Batch polymerization of 1,3-butadiene monomers with styrene monomers in the presence of an anionic initiator and a modifier also leads to a taper in the 1,2-microstructure of the butadiene segments when the polymerization temperature is permitted to rise adiabatically. However, the styrene distribution is fairly uniform and the butadiene microstructure taper is dependent on many factors including: the total change in temperature, $\Delta T$; the initial and maximum reaction temperatures; and the degree of polymerization conducted at each temperature. A distinct Tg is present for these polymers.

It is therefore desirable to precisely control tapering and prepare a postulated ideal rubber for use as tire tread.

SUMMARY OF THE INVENTION

A process for copolymerizing a diene monomer and a vinyl aromatic monomer in the presence of an anionic initiator and a modifier is provided. By continuously increasing both the ratio of the vinyl aromatic monomer to the diene monomer and the ratio of the modifier to the initiator throughout the process, a continuously tapered copolymer having a continuously increasing vinyl aromatic content and a continuously increasing 1,2-microstructure (vinyl content) along its chain length is prepared. The polymers and copolymers prepared herein have a flexible chain end that becomes progressively stiffer along the length of the chain and are characterized by displaying multiple glass transition temperatures of small energy absorption, i.e., no definable glass transition temperature.

DETAILED DESCRIPTION OF THE PREFERRED EMBODIMENTS

The polymers or copolymers prepared in accordance with the invention are prepared from one or more conjugated dienes. Polymerizable 1,3-diene monomers that can be employed in the production of the polymers or copolymers of the present invention are one or more 1,3-conjugated dienes containing from four to twelve, inclusive, carbon atoms per molecule. Exemplary monomers include 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkyl-1,3 butadienes, it is preferred that the alkyl groups contain from one to three carbon atoms. The preferred 1,3-diene monomer for use in the process of the present invention is 1,3-butadiene. The conjugated diene is used in an amount of from 40 to 100 parts by weight of the total polymer or copolymer.

In addition to the above-described conjugated dienes, 0 to 60 parts by weight of one or more copolymerizable monomers such as vinyl-substituted aromatic monomers, hereinafter vinyl aromatic, are incorporated into the polymerization mixture per 40 to 100 parts by weight of the conjugated diene monomers. Examples of suitable copolymerizable monomers for use in the preparation of copolymers in the present invention include: styrene; alpha-methylstyrene; 1-vinylnaphthalene; 2-vinylnapththalene; 1-alpha-methylvinyl-naphthalene; 2-alpha-methylvinylnaphthalene; and mixtures of these as well as alkyl, cycloalkyl, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; and 4,5-dimethyl-1-vinylnaphthalene. Occasionally, di- and tri- vinyl aromatic monomers are used in small amounts in addition with mono-vinyl aromatic monomers. The preferred vinyl aromatic monomer is styrene.

The monomers are provided to the reaction vessel in a suitable inert organic diluent. Many suitable inert diluents are known in the art. Preferred diluents generally include alkanes and cyclo- alkanes. Suitable diluents include, but are not limited to, ethane, propane, iso- and n-butane, iso- and n-pentane, iso- and n-hexane, iso- and n-heptane, iso- and n-octane, cyclobutane, cyclopentane, cyclohexane, cycloheptane and cyclooctane. Preferred diluents are iso- and n-hexane. The diluents can be employed either alone or in admixture. The concentration of monomer in diluent can range from 5 to 60 wt. percent or more and is generally dependent upon economics and the ability to control reaction conditions and to handle the polymer solution.

Any anionic initiator that is known in the art as useful in the polymerization of 1,3-diene monomers or copolymerization of diene monomers with vinyl aromatic monomers can be employed in the process of the instant invention. Suitable organo-lithium catalysts include lithium compounds having the formula $R(Li)_x$, wherein R represents a hydrocarbyl radical of 1 to 20, preferably 2 to 8 carbon atoms per R group and x is an integer from 1 to 4. Typical R groups include aliphatic radicals and cycloaliphatic radicals, such as alkyl, cycloalkyl, cycloalkylalkyl, alkylcycloalkyl, aryl and alkylaryl radicals. Specific examples of R groups for substitution in the above formulas include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, dimethylcyclopentyl, ethylcyclopentyl, methlcyclohexyl, dimethylcyclohexyl, ethylcyclohexyl, isopropylcyclohexyl, and the like.

Specific examples of other suitable lithium catalysts include: p-tolyllithium, 4-phenylbutyl-lithium, 4-butyl-cyclohexyllithium, 4-cyclohexylbutyl-lithium, lithium dialkyl amines, lithium dialkyl phosphines, lithium alkyl aryl phosphine, lithium diaryl phosphines and the like.

Other suitable anionic initiators include alkali metal trihydrocarbyl magnesiates, preferably lithium, sodium or potassium trihydrocarbyl magnesiate compounds represented by the structural formula:

$$MR_1R_2R_3Mg$$

wherein M is Li, Na or K, and $R_1$, $R_2$, $R_3$ are independently selected from the group consisting of a $C_2$–$C_{14}$ hydrocarbon organo radical. These $C_2$–$C_{14}$ organo radicals may be alkyl, aryl, cycloalkyl, cycloalkenyl-alkyl, aryl-alkyl, aryl-cycloalkyl, cycloalkylaryl, or ethylenically unsaturated organo radicals such as vinyl, allyl and propenyl. The preferred organo radicals $R_1$, $R_2$ and $R_3$ which can be employed in the present invention are n-hexyl, n-butyl, s-butyl, 2-ethylhexyl and n-octyl.

The preferred $MR_1R_2R_2Mg$ compounds for use in the present invention include sodium tri-n-hexyl magnesiate, sodium tributyl magnesiate, sodium dibutyl-hexyl magnesiate, and sodium butyloctyl-2-ethylhexyl magnesiate. Mixtures of different sodium or potassium trihydrocarbyl magnesiates can be employed in the anionic initiation systems. The use of an alkali metal trihydrocarbyl magnesiate serve to randomize styrene during copolymerization with 1,3-butadiene type monomers while maintaining a constant vinyl content, typically between 12% and 30%, in the butadiene contributed units.

Mixtures of lithium based and magnesiate anionic initiators can also be employed. The preferred catalysts for use in the present invention are n-butyllithium and sodium n-butyl-n-octyl-2-ethyl- hexyl magnesiate and mixtures thereof.

The millimole ratio of the anionic initiator to the weight of monomers which are employed in the preparation of polymers and copolymers of the present invention range between 0.20 to 20.0 millimoles of anionic initiator per hundred grams of monomer.

A 1,2-microstructure controlling agent or modifier is preferably used to control the 1,2-microstructure in the diene monomer contributed units and to randomize the amount of vinyl aromatic monomers such as styrene, incorporated with the diene monomer, such as butadiene, in the rubbery phase. Suitable modifiers include, but are not limited to, tetramethylethylenediamine (TMEDA), oligomeric oxolanyl propanes (OOPS), 2,2-bis-(4-methyl dioxane) (BMD), tetrahydrofuran (THF), bistetrahydrofuryl propane and the like. One or more randomizing modifiers can be used. The amount of the modifier to the weight of monomers ranges between 0.01 to 400.0 millimoles of modifier per hundred grams of monomer. As the modifier content increases, the percentage of 1,2-microstructure increases in the diene monomer contributed units.

The process of the invention is carried out in a polymerization reactor for a ionic polymerization as a semi-batch or starved feed process. As used herein, the terms "semi-batch" or "starved feed" refer to a batch-type process wherein the reactants are used up almost immediately upon their addition so that minimal unreacted reactant is present in the reaction vessel at any time.

A small amount of a diluent such as an alkane solvent such as hexane is introduced into the reactor and stirring is begun. An anionic initiator is introduced and the reactor is heated to a temperature between about 50° and 160° C., preferably between 90° and 120° C. Polymerization is begun by slowly adding the diene monomer in a diluent to the reactor. The rate of addition is controlled such that the monomer is used up in polymerization at approximately the same rate as the monomer is added to the reactor. A low vinyl block polymer of, for example, polybutadiene, can be formed at this point by delaying the next step of the process or the next step can begin immediately.

A modifier diluted in a diluent is slowly added to the stream entering the reactor. At the same time, a vinyl aromatic monomer such as styrene in a diluent is also slowly added. The ratio of vinyl aromatic monomer to diene monomer is continually increased from 0% to $(100-x)\%$ throughout the synthesis in order to achieve an average styrene content of $((100-x)/2)\%$. In general, x can range from 20 to 90, preferably from 40 to 70, in order to achieve an average styrene content of from 10 to 50%, preferably from 20 to 35%. The modifier level in the reactor also continuously increases from a modifier to initiator ratio of 0/1 to y/1 wherein y is between 0.05 and 20.0, preferably 0.20 and 5.0. The flow rates of all of the reactants, with the exception of the anionic initiator, are separately metered into the reaction vessel and it is within the contemplation of the invention that all flow rates and monitoring be controlled by computer.

In an alternate method, the charged ratio of vinyl aromatic monomer to diene monomer continuously increases during polymerization while the ratio of modifier to anionic initiator is continuously or sequentially increased to provide increasing 1,2-microstructure sequentially along the length the copolymer backbone. This method comprises charging a stirred tank with a diene/solvent blend being metered to the reactor containing anionic initiator. Concurrently a vinyl aromatic monomer blend and modifier held in a second tank is charged to the stirred tank at a constant rate. The effect of this process results in the charging of a monomer/solvent blend having a constantly changing vinyl aromatic monomer to diene monomer ratio, while the modifier to initiator ratio in the reactor also steadily increases during the course of the polymerization. The combination of polymerization temperature, flow rate, increasing modifier concentration and increasing aromatic monomer to diene monomer ratio results in random, but continuously increasing aromatic content and 1,2-microstructure along the chain length.

In a further alternate method, the charged ratio of vinyl aromatic monomer to diene monomer is continuously or incrementally decreased during polymerization. The ratio of modifier to anionic initiator can be maintained as constant to provide constant 1,2-microstructure. The ratio of modifier to anionic initiator can also be incrementally increased to provide an increasing 1,2-microstructure percentage in diene contributed units along the backbone chain. The initial charge into the reactor preferably contains 30 to 100 parts by weight of a vinyl aromatic monomer and 0 to 70 parts by weight of a diene monomer. The ratio of vinyl aromatic monomer to diene monomer introduced into the reactor continuously or incremetally is reduced during the preparation of the tapered copolymer. The final charge introduced into the reactor can contain from 0 to 30 parts by weight of vinyl aromatic monomer and 70 to 100 parts by weight of diene monomer.

In the production of polydiene polymers such as polybutadiene, the sequential or continuous increase of the ratio of modifier concentration to anionic initiator concentration in the reaction vessel promotes the production of a polydiene having an increasing 1,2-microstructure along its backbone chain segments.

Process conditions such as the initial and maximum temperature of the polymerization reaction can independently effect the final 1,2-microstructure content of the 1,3-diene copolymers or polymers. These conditions can be controlled for each monomer reaction system to produce the final desired average 1,2-microstructure content of from about fifteen (15) to forty (40) percent. It is desirable to produce polymers and copolymers having an average 1,2-microstructure between 20 and 35 percent in the 1,3-diene monomer contributed units. The 1,2-microstructure of the polymers produced in accordance with the process of the present invention preferably continually gradually increases along the growing chain due to the increasing concentration of modifier present in the reaction medium as the reaction proceeds. The percentage 1,2-microstructure along the backbone segments of the polymers or copolymers can increase from about 10% to about 90% along the backbone chain. Preferably the 1,2-microstructure gradually increases from a 10% to 30% average at the low side or first 30 percentile of polymer chain length to about a 30% to 90% average at the high side or the terminal 30 percentile of chain length. The average 1,2 microstructure in the first 30 percentile in the chain length of the polymer is preferably at least 15 to 20 percent lower than the average 1,2-microstructure in the terminal 30 percentile of the chain length of the polymer.

The term 1,2-microstructure as used in the present invention actually refers to the mode of addition of a growing polymer chain with a conjugated diene monomer unit. Either 1,2-addition or 1,4-addition can occur. For simplicity, the terms vinyl content or 1,2-microstructure are employed to describe the microstructure which results from 1,2-addition of conjugated dienes.

In either method of the present invention as the reactor is filled to capacity by block copolymer or polymer solutions, the remaining unreacted monomer, generally less than about 5% by weight of the formed block polymer or copolymer, is allowed to react to form an end block. Depending on the amount of this leftover monomer, a block of polymer of uniform composition will result. This block can be kept to an insignificant level or allowed to be as high as 20% by weight of the total polymer by control of temperature and flow rates.

The total block copolymer of the present invention can be represented by the structural formula:

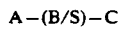

A—(B/S)—C wherein A is a block formed from diene monomers constituting 0 to 20 weight percent of the weight of the total block copolymer; (B/S) represents a tapered block copolymer formed from 50 to 100% by weight of diene monomers and 0 to 50% by weight of vinyl aromatic monomers wherein (B/S) constitutes 60 to 100% by weight of the total block copolymer, and C is a terminal block formed from 0 to 40 weight percent by weight of diene monomers and 60 to 100 by weight percent of vinyl aromatic monomers constituting 0 to 20 weight percent of the total block copolymer. In a preferred embodiment the (B/S) tapered block segment of the total block copolymer preferably contains an average of 5 to 30%, preferably 10 to 20%, of 1,2-microstructure in the first 30 percentile of chain length; from 20 to 50%, preferably 20 to 35% of 1,2-microstructure in the middle 40 percentile of chain length; and from 30 to 90%, preferably 35 to 60% of 1,2-microstructure in the terminal or remaining final 30 percentile of chain length. The average 1,2-microstructure preferably varies at least 10% between each of the three segments identified as the initial 30 percentile, the middle 40 percentile and the terminal 30 percentile of chain length of the (B/S) tapered copolymer. 20 The preferred A-(B/S)-C structure contains at least 80% by weight of the (B/S) taper and the most preferred structure contains 100% (B/S) taper with no A or C terminal blocks.

Only one tapered block is present in the copolymers prepared in accordance with the process of the invention since the block is continuously tapered in accordance with the present process. The continuously tapered copolymer will have no definable glass transition temperature in the (B/S) block portion. The terminal "C" is formed from essentially all the remaining 1,3-diene monomer and vinyl aromatic monomer when monomer metering is stopped. In general, the unreacted monomers will constitute less than 5% of the total monomer reacted in the process. Accordingly, the size of the terminal block "C" can be kept at an insignificant level or allowed to be as high as 20% of the total polymer by control of temperature and flow rates. In a preferred embodiment, the diene monomer is 1,3-butadiene and the vinyl aromatic monomer is styrene. The copolymers prepared in accordance with the invention have molecular weights between 50,000 and 550,000, preferably between 100,000 and 350,000.

In an alternate embodiment, no vinyl aromatic monomer is employed in the preparation of the polymers. A continuously tapered diene polymer, preferably a polybutadiene polymer, having a continuously increasing 1,2-microstructure (vinyl content) along the chain length is prepared. Preferably the vinyl content varies between from 10% to 90%, most preferably from between 15% to 60%. These polydienes possess an average 1,2-vinyl content ranging between 25 to 40%. These polymers also have multiple glass transition temperatures, $T_g$, of very small energy absorption, or no real $T_g$ at all. The polymers have a molecular weight between 50,000 and 400,000 have a flexible chain end that progressively becomes stiffer along the length of the chain. The change in 1,2-microstructure along the chain length is the same as has been previously discussed for the (B/S) tapered block copolymer segment.

The sequential charges of vinyl aromatic monomer, preferably styrene, into the reactor can also be maintained at constant or decreasing charged amounts; thereby producing a tapered block copolymer having a constant or decreasing styrene content or other vinyl aromatic content, while tapering the 1,2-microstructure in accordance with the previously defined procedures. Thus the process of the present invention can be utilized to prepare tapered copolymers having: (1) both tapered vinyl aromatic monomer content and 1,2-microstructure per sequential block formation, (2) tapered 1,2-microstructure and constant or decreasing vinyl aromatic monomer content per sequential block formation and (3) tapered vinyl aromatic monomer content and constant 1,2-microstructure per sequential block formation. In the preparation of polydiene polymers, tapering occurs by sequentially increasing the 1,2-microstructure along the length of the polydiene chain preferably a polybutadiene chain.

As described, the diene monomer, vinyl aromatic monomer and modifier are added separately to the polymerization reactor. The monomer ratios are uniformly varied through the course of the reaction while the modifier level can steadily rise. The steady rise in modifier level yields a steady increase in vinyl content and also aids in encouraging random addition of vinyl monomer to the copolymer.

The copolymers and polymers produced in accordance with the present invention are useful in the manufacture of tire treads as well as other molded rubber goods.

The following examples are presented for purposes of illustration only and are not to be construed in a limiting sense. All percentages are by weight unless otherwise identified.

EXAMPLE 1

This comparative example displays a typical semi batch polymerization of butadiene and styrene using n-butyllithium as the anionic initiator. A charge of 36.0 mmoles of n-butyllithium and 14.4 mmoles of bistetrahydrofuryl propane in 32 lbs. hexane was added to a 20 gal. stirred reaction vessel and the vessel was heated to a temperature of 90° C. Subsequently, 22.2 lbs. of a 33% solution of 1,3-butadiene in hexane and 8.1 lbs. of a 33% solution of styrene in hexane were slowly added and polymerization was allowed to proceed. The results displaying NMR, IR and the glass transition temperature for the polymer prepared are shown in TABLE I.

EXAMPLE 2

A tapered copolymer is prepared in accordance with the semi-batch or starved-feed process of the invention. A charge of 4.5 mmoles of n-butyllithium in hexane was added to a stirred 2 gal. reaction vessel. In addition, 4.6 lbs. of a 24.8% solution of 1,3-butadiene in hexane was charged to a first stirred holding tank. N$_2$ was used to create a pressure differential between the first stirred holding tank and the reaction vessel. Two lbs. of 19.2% solution of styrene in hexane and 9.0 milliequivalents of OOPS were charged to a second holding tank. N$_2$ was used to create pressure in the second holding tank that was higher than the pressure in the first stirred holding tank. Alternatively, positive displacement pumps could have been used to control flow between the tanks and the reaction vessel.

The 1,3 butadiene in hexane solution was charged from the stirred holding tank to the reaction vessel and began to polymerize. At this stage, the polybutadiene structure displayed a low vinyl content of less then 13% 1,2-microstructure. The styrene and OOPS modifier in hexane charge in the second holding tank was injected into the first stirred holding tank in order to steadily increase the ratio of styrene to 1,3-butadiene. In addition, the concentration of modifier in the first stirred tank also increased steadily. The changing concentrations of reactants and modifier were transferred to the reactor where the increasing modifier levels steadily raised the vinyl content of the copolymer prepared and the changing styrene to 1,3-butadiene ratio steadily changed the monomer composition along the chain. When the reaction vessel was nearly filled to capacity, the contents of the second holding tank were completely emptied into the stirred tank. The small amount of the remaining reactants in the stirred tank was then transferred to the reaction vessel and the last of the monomer was reacted. A standard workup including termination, antioxidant addition, and solvent stripping followed. The product was analyzed and the results of NMR, IR, GPC and ML-4 at 212° C. are shown in TABLE I. The continuously tapered copolymer displayed no clear glass transition temperature.

EXAMPLES 3-6

Continuously tapered polymers or copolymers were prepared in accordance with the procedure described in Example 2 using amounts of reactants in accordance with TABLE II.

In Example 5, no styrene was used and a continuously tapered polymer of butadiene was obtained.

In Example 6, no modifier was used, however the anionic initiator included 3.5 mmoles of n-BuLi and 10. milliequivalents of Na-n-butyl-n octyl-2-ethylhexyl magnesiate. The 27% solution of styrene in the second holding tank was blended in situ, with 2.7 lbs. of a 23.3% solution of 1,3-butadiene in hexane and an additional 5.3 lbs. of hexane. This blend of 1,3-butadiene and styrene in hexane was transferred to the stirred tank containing 1,3-butadiene in hexane as the contents of the stirred tank were transferred to a 5.0 gallon polymerization reactor.

The results of NMR, IR, GPC, ML and T$_g$ on all of Examples 1-6 are shown in the following TABLE I.

EXAMPLE 7

A 50 gallon reactor was utilized in this process while pressure, temperature and blend flow was monitored and controlled by a computer control system. Monomers were charged using micromotion mass flow meters tied into the computer. Flow rates of reactants were appropriately adjusted every second by 0.0001 lb./sec.

Charges of 4.93 lbs. of a 24.5% solution of 1,3-butadiene in hexane, and 12.4 lbs. of a 35.6% solution of styrene in hexane were thus introduced into a reactor containing 45.3 lbs. of hexane and 37.45 mmoles of n-BuLi and 33.0 mmoles of bistetrahydrofuryl propane. The temperature of the reactor rose from 84° to 100 C. during a metering time of 65 minutes. The final copolymer was terminated with isopropanol. A dibutyl-p-cresol antioxidant was added to a final copolymer having no sharp T$_g$ and the properties displayed in TABLE I.

EXAMPLE 8

The process as described in Example 7 was utilized to prepare a tapered styrene-butadiene copolymer having a decreasing amount of styrene contributed units along the copolymer backbone.

The initial charge into the reaction vessel was 60 parts by weight of a 15% solids solution of styrene in hexane and 40 parts by weight of a 15% solids solution of 1,3-butadiene in hexane in the presence of OOPS/n-BuLi in a 0.4 ratio at 90° C. The amount of styrene monomer solution injected was gradually reduced to 0.0 parts by weight and 100% of the total monomers were polymerized. The final recovered copolymer displayed no detectable T$_g$ and properties shown in TABLE I.

TABLE 1

| EXAMPLE NO. | 1 | 2 | 3 | 4 | 5 | 6 | 7 | 8 |
|---|---|---|---|---|---|---|---|---|
| $^1$H nmr | | | | | | | | |
| % 1,2 | 28.4 | 30.4 | 24.8 | 28.3 | 29.8 | 20.3 | 16.4 | 24.0 |
| % Styrene | 26.8 | 25.4 | 25.9 | 24.9 | — | 19.0 | 26.7 | 32.0 |
| % Block Styrene | 0 | 0 | 0 | 0 | — | 0 | | 0 |
| I.R. | | | | | | | | |
| % cis 1,4 | — | 28.5 | 27.6 | 26.8 | 27.9 | 31.2 | | |
| % trans 1,4 | — | 43.7 | 42.8 | 42.5 | 43.1 | 48.6 | | |
| % 1,2 | 26.6 | 27.8 | 29.6 | 30.7 | 29.0 | 20.2 | | |
| % Styrene | — | 27.8 | 31.1 | 27.8 | — | 19.5 | | |
| G.P.C. | | | | | | | | |
| $M_n$ | 165,000 | 212,000 | 300,000 | 338,000 | 188,000 | 201,000 | 170,000 | 171,000 |
| $M_w$ | 285,000 | 366,000 | 449,000 | 505,000 | 384,000 | 357,000 | 242,000 | 301,000 |
| $M_w/M_n$ | 1.73 | 1.72 | 1.50 | 1.49 | 2.04 | 1.78 | 1.42 | 1.76 |
| ML-4 @ 212° F. | 68.0 | 87.5 | 98.5 | 121.0 | 17.3 | 10.8 | 42.0 | 106.0 |
| $T_g$ (DSC) | −47° | — | — | — | — | — | — | — |

TABLE II

| EXAMPLE NO. | 3 | 4 | 5 | 6 |
|---|---|---|---|---|
| nBuLi (mmole) | 4.0 | 4.0 | 9.0 | 3.5 |
| OOPS (mequiv.) | 8.0 | 8.0 | 18.0 | — |
| Hexane (lbs.) | 2.0 | 2.0 | 5.1 | 1.0 |
| Reactor size (gal.) | 2 | 2 | 5 | 5 |
| Butadiene blend | | | | |
| lbs. | 4.6 | 4.6 | 17.9 | 11.0 |
| % in hexane | 24.8 | 24.1 | 23.7 | 23.3 |
| Styrene blend | | | | |
| lbs. | 2.0 | 2.0 | — | 3.0 |
| % in hexane | 19.2 | 19.2 | — | 27.0 |
| Temperature (°C.) | 80–93 | 80–93 | 93–112 | 90–100 |
| Charging time (minutes) | 210 | 165 | 159 | 185 |

I claim:

1. A process for preparing a continuously tapered polymer from reactive monomers comprising 40 to 100 parts by weight of one or more conjugated diene monomers and from 0 to 60 parts by weight of one or more vinyl aromatic monomers comprising continuously or incrementally injecting said reactive monomers into a reaction vessel in the presence of an anionic initiator and continuously or incrementally increasing the amount of a randomizing modifier at a rate sufficient to produce a tapered polymer having no clear $T_g$ as determined by DSC said randomizing modifier comprising a 1,2-microstructure controlling agent contacting said monomers and polymerizing said monomers into a tapered polymer.

2. The process as defined in claim 1 wherein said reactive monomers are injected into the reaction vessel in a continuously increasing ratio of vinyl aromatic monomer to diene monomer.

3. The process of claim 1 wherein the conjugated diene monomer is 1,3-butadiene and the vinyl aromatic monomer is styrene.

4. The process of claim 1 wherein the anionic initiator is selected from the group consisting of organo-lithium compounds having the formula $R(Li)_x$, wherein R is a hydrocarbyl radical of 1 to 20 and x is an integer from 1 to 4, alkali metal trihydrocarbyl magnesiate compounds having the formula $$MR_1R_1R_2R_3Mg$$

wherein M is lithium sodium or potassium and $R_1$, $R_2$ and $R_3$ are independently selected from the group consisting of $C_2$–$C_{14}$ hydrocarbon organo radical.

5. The process of claim 1 wherein the anionic initiator is present in an amount between 0.2 to 20.0 millimoles per hundred grams of monomer.

6. The process of claim 1 wherein the randomizing modifier is present in an amount between 0.01 to 400 millimoles per hundred grams of monomer.

7. The process of claim 1 wherein the ratio of randomizing modifier to anionic initiator is continuously increased as the modifier is introduced into the reaction vessel.

8. The process of claim 1 wherein the modifier is selected from the group consisting of TMEDA, OOPS, BMD, THF, bistetrahydrofuryl propane and mixtures thereof.

9. The process of claim 1 wherein the reaction is carried out in an alkane diluent.

10. The process of claim 1 wherein the reaction is carried out at a temperature between 50° and 160° C.

11. A process for preparing a continuously tapered polymer from reactive monomers said polymer comprising 40 to 100 parts by weight of one or more conjugated diene monomers and from 0 to 60 parts by weight of one or more vinyl aromatic monomers comprising continuously or incrementally injecting diene monomers and vinyl aromatic monomers in an increasing ratio of vinyl aromatic monomers to diene monomers into a reaction vessel in the presence of an anionic initiator and polymerizing said monomers into a tapered polymer wherein said ratio is increased at a rate sufficient to produce a tapered polymer having no clear $T_g$ as determined by DSC.

12. A polybutadiene polymer having an average 1,2-microstructure ranging from about 15 to 40 percent and a chain length comprising a first 30 percentile and a terminal 30 percentile, wherein the first 30 percentile of the chain length has an average 1,2-microstructure of at least 20 percent lower than the average 1,2-microstructure of the terminal 30 percentile of the chain length.

13. A continuously tapered copolymer prepared by anionic polymerization having the structure:

$$A-(B/S)-C$$

wherein A represents a block formed from diene monomers, B/S represents a continuously tapered block formed from vinyl aromatic monomers and diene monomers wherein the vinyl aromatic monomer contributed units and percentage of 1,2-microstructure continuously increase along the length of the chain, and C represents a block of 1,3-diene and vinyl aromatic monomer and wherein the continuously tapered copolymer has no clear glass transition temperature as determined by DSC, and A and C each constitute 20 percent or less by weight of the tapered copolymer.

14. The continuously tapered copolymer of claim 13 said copolymer having a chain length wherein (B/S) represents a continuously tapered block formed from 10 to 50 percent by weight of vinyl aromatic monomers and 50 to 90 percent by weight of diene monomers wherein the first 30 percentile of the chain length contains 5 to 30 percent of 1,2-microstructure, the middle 40 percentile of chain length contains 20 to 50 percent of 1,2-microstructure and the terminal 30 percentile of chain length contains 30 to 90 percent of 1,2-microstructure.

15. The continuously tapered copolymer of claim 14 wherein said chain length of the continuously tapered block copolymer comprises a 10 to 20 percent of 1,2-microstructure in the first 30 percentile, a 20 to 35 percent of 1,2-microstructure in the middle 40 percentile, and 35 to 60 percent of 1,2-microstructure in the terminal 30 percentile.

16. The continuously tapered copolymer of claim 14 wherein the 1,2-microstructure of the (B/S) taper block varies by at least 10% in increasing number along the chain length for the first 30 percentile, the middle 40 percentile and the terminal 30 percentile of chain length.

17. The continuously tapered copolymer of claim 13 wherein A and C comprise 0 percent by weight of the tapered copolymer.

18. The continuously tapered copolymer of claim 13 wherein the increase in the number of vinyl aromatic monomer contributed units and the percentage of 1,2-microstructure is a gradual increase.

19. The continuously tapered copolymer of claim 13, wherein the diene monomer is 1,3-butadiene.

20. The continuously tapered copolymer of claim 13, wherein the vinyl aromatic monomer is styrene.

21. A process for preparing a continuously tapered polymer from reactive monomers said tapered polymer comprising 40 to 100 parts by weight of one or more conjugated diene monomers and from 0 to 60 parts by weight of one or more vinyl aromatic monomers comprising continuously or incrementally injecting diene monomers and vinyl aromatic monomers in an increasing ratio of diene monomers to vinyl aromatic monomers into a reaction vessel in the presence of an anionic initiator and a 1,2-microstructure controlling agent and polymerizing said monomers into a tapered polymer having no clear Tg as determined by DSC wherein said tapered polymer comprises 60 to 100 percent by weight of vinyl aromatic monomer contributed units in an initial block and 0 to 20 percent by weight of vinyl aromatic monomer contributed units in a terminal block.

* * * * *